United States Patent [19]

Mayer

[11] 4,104,600

[45] Aug. 1, 1978

[54] INTEGRATED ABSORPTIVE POWER LINE FILTERS

[76] Inventor: Ferdy P. Mayer, 18 rue Thiers, 38000 Grenoble, France

[21] Appl. No.: 729,628

[22] Filed: Oct. 5, 1976

[30] Foreign Application Priority Data

Oct. 6, 1975 [FR] France ................................ 75 30476

[51] Int. Cl.[2] .......................... H04B 3/28; H01H 7/14; H01P 1/00

[52] U.S. Cl. ......................................... 333/79; 333/12; 333/96

[58] Field of Search .............................. 333/12, 79, 96

[56] References Cited

U.S. PATENT DOCUMENTS

| | | | |
|---|---|---|---|
| 2,387,783 | 10/1945 | Tawney | 333/96 |
| 2,756,394 | 7/1956 | Sieven et al. | 333/96 |
| 3,683,309 | 8/1972 | Hirose | 333/12 |

OTHER PUBLICATIONS

*Lundy "Lossy Line" Flexible Filter,* Lundy Electronics & Systems, Inc., Glen Head, N.Y. 11545, 1966.

*Primary Examiner*—Alfred E. Smith
*Assistant Examiner*—Harry Barlow
*Attorney, Agent, or Firm*—Sughrue, Rothwell, Mion, Zinn and Macpeak

[57] ABSTRACT

A low pass filter produced by cable-manufacturing techniques and using a long, distributed capacitance "filter-line" which, when cut into pieces, produces lumped lossy filters. To exhibit appreciable distributed capacitance together with magnetic flux concentration, use is made of special dielectromagnetic materials based on mixtures which synthesize high permittivity, low permeability and high losses.

4 Claims, 5 Drawing Figures

INTEGRATED ABSORPTIVE POWER LINE FILTERS

BACKGROUND OF THE INVENTION

This invention relates to a low-pass filter of the coaxial cable type comprising several layers, produced by cable-manufacturing techniques and using a long, distributed capacitance "filter-line" which, when cut into pieces, produces lumped lossy filters.

The difficulties of the brute force low pass filter to suppress interference in electrical power circuits are well known. Essentially, such filters use reactive elements which do not destroy the parasitic energy but only switch or convey it to ground, with more or less success.

The efficiency of the "absorption" principle, which dissipates stopband energy in the form of heat inside the filter, is well known from U.S. Pat. Nos. 3,191,132 and 3,309,633, and this principle has been studied and adopted by a number of companies. Lossy lines are now universally accepted for high performance car ignition cables. Lossy filters exist, with various approaches to introduce absorption in or between the reactive components of the filter. In the inductive components such approaches include direct magnetic losses through special magnetic materials, synthesized magnetic losses, and conductive losses through artificial skin effects (see U.S. Pat. No. 3,573,676). In the capacitive components such approaches include dielectric losses through special dielectric materials, and synthesized dielectric losses by diffusion, by semiconductive materials, by mixtures, etc. As between inductive and capacitive components such approaches include interface losses through multiple reflections or pseudoresonances (see French Pat. No. 1.479.228). All of these effects can be used alone or together, and embody an "integrated" concept of lossy filters.

SUMMARY OF THE INVENTION

On these bases, a new filter concept has been developed using cable-manufacturing techniques and producing a long, distributed capacitance "filter-line", which when cut into pieces produces lumped lossy filters.

Such a technique permits the realization of very inexpensive filters wherein adaptation to a particular filtering problem is simply done by cutting a predetermined length of "filter" from the cable. The result is a "tailor-made" filter whose low frequency performance is determined primarily by its length (for otherwise given dimensions) and having very good high frequency performance due to its coaxial construction and the introduction of several of the above mentioned loss-effects (see French Patent Application No. 70 28499).

According to the invention, the filter includes a lossy magnetic core, a single layer close spaced wire winding, a special magnetic layer, and an outer conductive sheath for connection to a ground terminal. The magnetic effects of the core and of the special magnetic layer are of the high frequency absorptive type through magnetic and dielectric losses, the outer layer being so formed as to comprise a conductive path to a ground terminal great enough to introduce an important ground conductance with a resistivity sufficient to admit the penetration of currents and field at the maximum utilization frequency.

Preferably, the wire of the wound layer is insulated, or the outer conductive sheath is coated with an insulating layer on its inner surface engaging the special magnetic layer.

DETAILED DESCRIPTION OF THE PREFERRED EMBODIMENT

Figure 1:
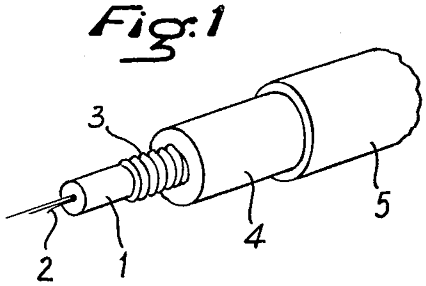
FIG. 1 shows a perspective view of a filter-line according to the invention, with parts broken away.

Referring now to FIG. 1, the filter line of the invention comprises a lossy magnetic core 1 which may be extruded around a textile thread 2. An insulated copper wire forming a single layer close spaced winding is wound around the core 1. Over this is a sleeve 4, preferably extruded from a magnetic material, having a high dielectric permittivity and a certain conductivity and which acts simultaneously as a magnetic flux return path and as a dielectric. This layer is hereinafter termed a "dielectromagnetic" layer. In this latter function, it is responsible for the distributed capacitance between the conductive winding 3 and an outer conductive sheath 5, which in use is connected to a ground terminal.

Figure 2:
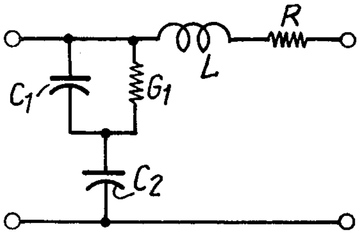
FIG. 2 shows a schematic diagram of an electrical circuit equivalent to a length of filter.

In a filter cable according to FIG. 1, $C_2$ in FIG. 2 is provided by the normal insulation of the conductive wire, which is as high as possible and may be a special dielectric, like metal oxides etc. having a small thickness. Alternatively, the coiled conductor may be bare and in touch with the dielectromagneticum, and $C_2$ is provided as a coaxial capacitor at the outer "conductive sheath" electrode (for example oxidized aluminum foil), preferably coated with an insulating layer on its inner surface.

The construction is somewhat similar to a magnetic delay line construction, but with a few major differences due to the fact that as low a cut-off frequency as possible and as high an absorption (i.e. losses) as possible are needed.

From an electrical point of view, the equivalent circuit shown in FIG. 2 contains a series element composed of a selfinductance L and a frequency dependent resistor R, including ohmic resistance, normal skin effect, artificial skin effect due to the surrounding conductive dielectromagnetic layer, and magnetic losses. The shunt element of the equivalent distributed circuit contains a pure capacitance $C_2$ due to the insulation of the conductor in series with a lossy capacitance $C_1$ due to the dielectrogmagnetic, the losses being due essentially to its admittance $G_1$.

The dielectromagnetic medium 4 has useful magnetic permeability, high magnetic losses, and a high "Maxwell-Wagner type" dielectric permittivity with associated dielectric losses. This medium is manufactured by thermally treating a mixture of special ferrites, conductive powder additives, etc. . . in an elastomer matrix. Permittivities $\epsilon$ in the order of 50,000 in the MHz-range have been realized on an industrial basis.

Such structures are known in scientific literature as providing artificial dielectricum having very high permittivity, in connection with a conductor, which is variable in terms of frequency. As an example, such a mixture may have the following composition:

80% fine powdered NI-Zn ferrite (max. grain size 0.2 mm)

5% carbon black powder, and

15% polyvinyl chloride.

Another composition may be:

85% powdered Mn-Zn ferrite wih excess of bivalent iron (max. grain size 0.1 mm)

3% carbon black powder, and

12% rubber.

The heat treatment of such mixtures is preferable.

Figure 3:
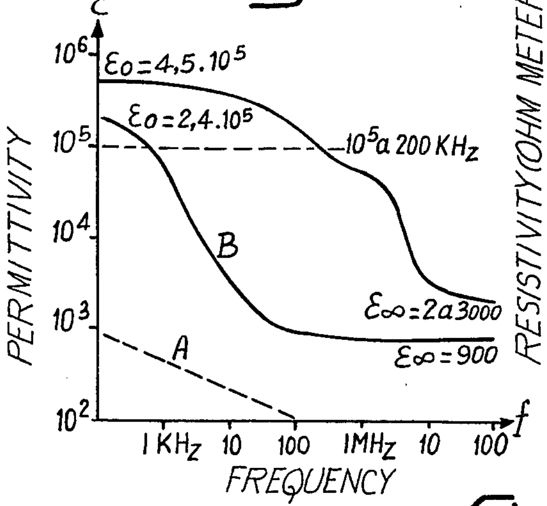
FIG. 3 is a plot of the permittivity or dielectric coefficients as a function of frequency.
Figure 4:
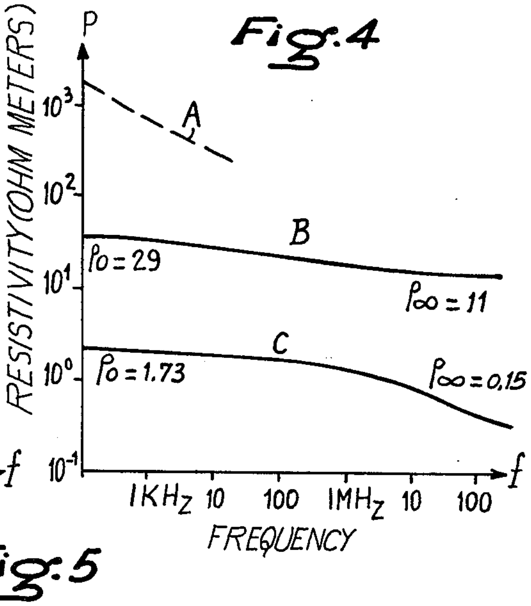
FIG. 4 is a plot of the resistivity of the dielectromagnetic medium as a function of frequency.

Curves A, B and C in FIGS. 3 and 4 show, for a layer made from the first mixture above, the variations of permittivity $\epsilon$ (FIG. 3) and resistivity $\rho$ (FIG. 4) without heat treatment (curves A), with a first heat treatment (curves B) and with a second heat treatment (curves C).

The first heat treatment consists of a heating in an oven, in a neutral medium, at 160° C for one hour, and the second at 170° C for the same period. This treatment causes the grains to become oriented and forms chains of carbon grains within the ferrites.

For the second mixture, wherein the matrix is rubber, the heating temperature must be higher. If it is too high, however, the polyvinyl chloride may decompose with the formation of carbon, which may contribute partially or totally to the conductivity, but the structure becomes more rigid.

It is well-known in the art that rubber is able to withstand higher temperatures than polyvinyl chloride, and such curing or treatment temperature of rubber is well-known.

The frequency dependent dielectric and magnetic losses can be controlled to provide an essentially absorptive filter, whereby resonance effects in the lower frequency range, in connection with a capacitive or inductive load at the filter's interface, are minimized. As a result the filter's insertion loss (IL) is due essentially to the intrinsic absorption of the filter and is thus proportional to the length of the filter. This is an important factor for practical filter designs. In the same manner, resonance effects in the very high frequency ranges are completely eliminated and the Insertion Loss over 100 MHz exceeds any practically measurable level, i.e. 120 db.

Figure 5:
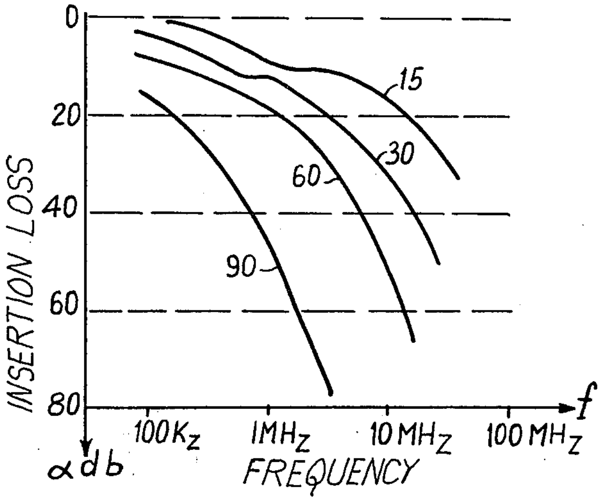
FIG. 5 is a plot of the insertion loss as a function of frequency.

High values of overall shunt capacitance ($C_1$ and $C_2$) together with high values of inductance L assure very high IL performance for the filter, which has heretofore been unobtainable in any monolithic structure without lumped capacitors having very high frequency response. The combined reactive and resistive effects with their frequency dependance give IL curves with a slope of 25 to 30 db/octave for an excellent cut-off characteristic. Typical cut-off frequencies (IL = 40 db) are 50 MHz, 20 MHz, 5 MHz, and 700 Khz for filters with lengths of 15 mm (curve 15 in FIG. 5), 30 mm (curve 30), 60 mm (curve 60) and 90 mm (curve 90), respectively, for a cable with the following characteristics:

diameter of insulated wire: 0.08 mm diameter of the core: 3.0 mm outer diameter (sheath 5): 4.5 mm The capacity is about 20 nF/cm.

The single layer winding concept together with the excellent heat conduction of the dielectromagneticum give the filter a high power capacity. A conductive wire of 0.08 mm diameter has a current capacity of up to 0.6A at a temperature increase of 55° C to a heavy heat sink.

The structure of the magnetic composite core and dielectromagnetic composite sheath provide a practically unsaturated magnetic medium, and the heat capacity limit is reached before any saturation occurs from the low frequency or dc power flow. Effective permeabilities are in the range of 6 to 12.

The IL is proportional to the length of the filter, and is independent of the transverse dimensions as long as the ratio of conductor, core and sheath diameter remain constant. On the other hand, the current capacity is proportional to only the transverse dimensions of the filter, and independent of its length.

What I claim is:

1. A low-pass filter having a coaxial cable structure and including at least four layers, comprising:

(a) a lossy magnetic core, (b) a single layer winding of closely spaced conductive wire surrounding said core, (c) a special magnetic layer surrounding said winding, and (d) a conductive outer sheath surrounding said magnetic layer and adapted to be connected to a ground terminal, wherein the magnetic effects of the core and of the special magnetic layer are of the high frequency absorptive type through magnetic and dielectric losses, and the outer layer is so formed as to comprise a conductive path to ground great enough to introduce an important ground conductance with a resistivity sufficient to admit the penetration of currents and fields at frequencies equal to or higher than the maximum utilization frequency.

2. A filter according to claim 1, wherein the conductive wire is insulated.

3. A filter according to claim 1, wherein the inner surface of the outer conductive sheath is coated with an insulating layer.

4. A filter according to claim 1, wherein frequency dependent electrical and magnetic losses are chosen to provide an essentially absorptive filter so that resonance effects in low frequency fields, in connection with the filter interface, are reduced to a minimum.

* * * * *